United States Patent [19]

Gustafson

[11] Patent Number: 5,404,918
[45] Date of Patent: Apr. 11, 1995

[54] CRYOGENIC LIQUID STORAGE TANK

[75] Inventor: Keith Gustafson, Waleska, Ga.

[73] Assignee: Minnesota Valley Engineering, Inc., New Prague, Minn.

[21] Appl. No.: 117,302

[22] Filed: Sep. 3, 1993

[51] Int. Cl.$^6$ .................................................. B65B 3/04
[52] U.S. Cl. ............................................. 141/1; 141/5; 141/198; 141/35; 220/4.12; 137/576
[58] Field of Search ............... 220/501, 4.12; 137/264, 137/571; 141/35, 1, 5, 230, 198

[56] References Cited

U.S. PATENT DOCUMENTS

| | | | |
|---|---|---|---|
| 1,518,906 | 12/1924 | Edwards | 137/576 |
| 2,293,263 | 8/1942 | Kornemann | 137/264 X |
| 2,780,922 | 2/1957 | Johannesen | 220/4.12 X |
| 2,971,667 | 2/1961 | Benson et al. | 220/4.12 X |
| 3,049,226 | 8/1962 | Schurr | 220/501 X |
| 3,424,186 | 1/1969 | Sparks | 137/576 |
| 3,712,502 | 1/1973 | Basier et al. | 220/501 X |
| 3,804,291 | 4/1974 | Fricker | 220/501 X |
| 4,142,562 | 3/1979 | Murray | 141/206 |
| 4,823,829 | 4/1989 | Woods | 137/264 X |

FOREIGN PATENT DOCUMENTS

| | | | |
|---|---|---|---|
| 33111 | 3/1977 | Japan | 137/576 |
| 71659 | 6/1981 | Japan | 220/501 |

*Primary Examiner*—Ernest G. Cusick
*Attorney, Agent, or Firm*—Rockey, Rifkin and Ryther

[57] ABSTRACT

The storage tank consists of a main tank and ullage tank connected by a relatively small passage having a flow rate capacity up to 30% of the main fill line. To fill the tank, liquid cryogen is delivered to the main tank by either a top or bottom fill. Because the fill line is significantly larger than the passage, the main tank will become liquid full while the ullage tank remains substantially empty. When the tank becomes liquid full a dramatic drop in the flow rate will result that can be detected by a relatively insensitive, and inexpensive, flow monitoring device thereby to stop the filling operation. The ullage tank will retain trapped gas and gradually allow the liquid from the main tank to enter the ullage tank through the passage until the liquid level in the tanks are equal. Once the liquid levels in the tanks equalize, a vapor space is created above the liquid to accommodate vaporizing cryogen and provide long hold times.

7 Claims, 3 Drawing Sheets

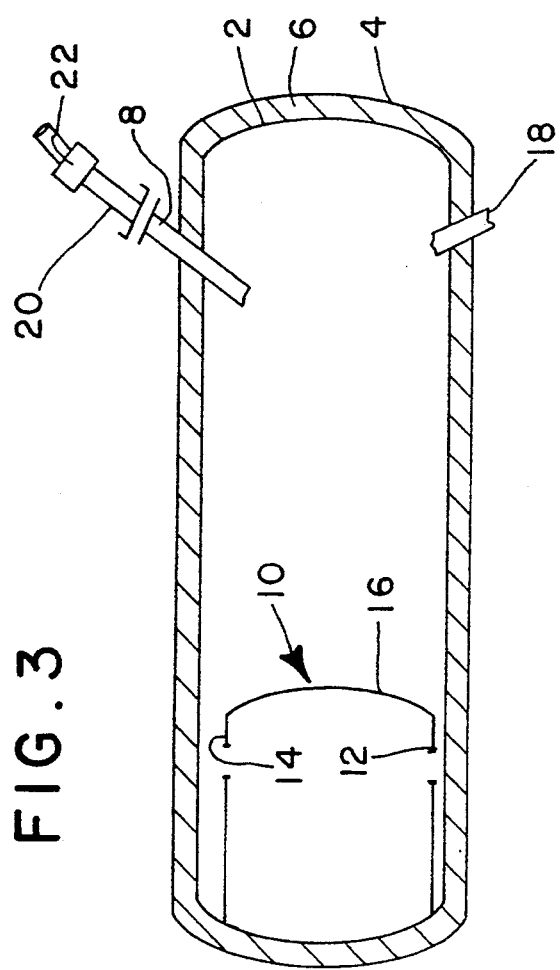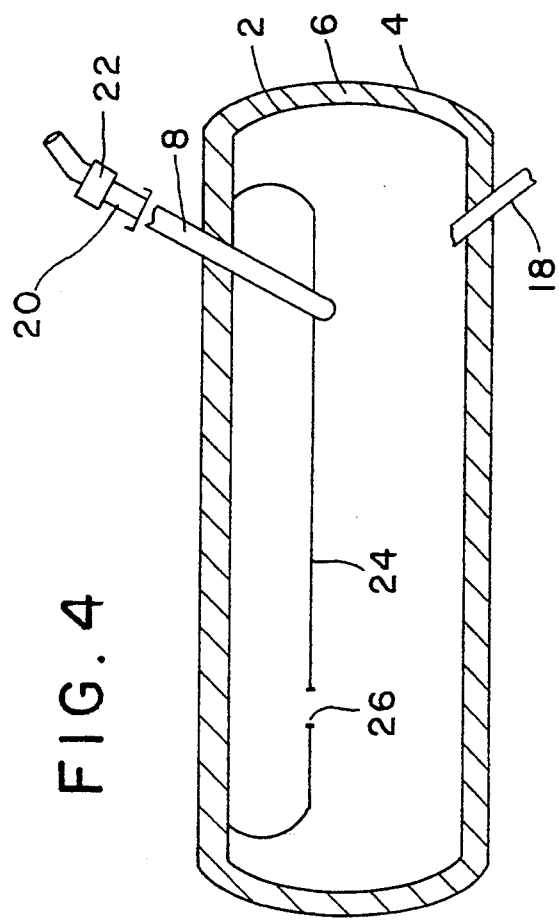

CRYOGENIC LIQUID STORAGE TANK

BACKGROUND OF THE INVENTION

The invention relates, generally, to cryogenic liquid storage and delivery systems and, more particularly, to an improved storage tank for such liquids.

As is well known, cryogenic liquids, such as liquid natural gas (LNG), nitrogen, oxygen, $CO_2$, methane, hydrogen and the like, are liquified gasses that exist at extremely cold temperatures. Special problems are encountered in handling cryogenic liquids because of the extremely cold temperatures required to maintain the liquid phase. One such problem is encountered in single line filling of storage tanks. While the tank of the invention can be used with virtually any cryogenic liquid, reference will be made specifically to LNG to facilitate explanation of the invention.

Presently tanks are filled by spraying sub-cooled LNG into the top of the tank via a spray head thereby to condense the gas in the tank and collapse the pressure head therein. When the pressure head collapses, the pressure in the tank is substantially reduced such that the cryogenic liquid can freely flow into the tank. The cryogen will continue to flow into the tank until the level of the cryogen reaches and submerges the spray head. Once the spray head is submerged, the pressure in the tank will gradually increase because the incoming sub-cooled cryogen is no longer in direct contact with and therefore unable to collapse the pressure head as quickly. However turbulance in the tank keeps the liquid from stratifying therefore the vapor space continues to collapse until the tank is liquid full. A pressure monitor is placed in the fill line to automatically shut-off the flow of cryogen when the pressure in the tank reaches a predetermined value corresponding to the desired fill level of cryogenic fluid. The head or ullage space, i.e. the area between the top of the liquid cryogen and the top of the tank, accommodates the vaporizing cryogen and increases the hold time of the tank before venting occurs.

While the above-described fill system is workable, it requires a very sensitive and expensive pressure monitoring device to determine when the spray head is submerged because the pressure rise is relatively small. If the pressure monitor does not detect the pressure rise, the tank will completely fill with liquid. A liquid full tank is undesirable for a number of reasons including the reduction of the hold time of the tank to near zero because there is no head or ullage space to accommodate the vaporizing liquid cryogen.

Thus, an improved filling system for cryogenic fluids is desired.

SUMMARY OF THE INVENTION

The cryogenic tank of the invention overcomes the above-noted shortcomings of the prior art by dividing a storage tank into a main tank and smaller secondary or ullage tank. A fill line delivers liquid cryogen to the main tank. The main tank and ullage tanks are connected by a relatively small passage having a flow rate capacity up to 30% of the fill line. To fill the tank, liquid cryogen is delivered to the main tank through the fill line using either a top or bottom fill. Because the fill line is significantly larger than the passage, the main tank will become liquid full. When the main tank becomes liquid full, a dramatic drop in liquid flow will result due to the reduction in flow area that can be detected by a relatively insensitive and inexpensive flow monitoring device thereby to stop the filling operation. The ullage tank will retain trapped gas and gradually allow the liquid from the main tank to enter the ullage tank through the passage until the liquid levels in the main and ullage tanks are equal. Once the liquid levels in the tanks equalize, a vapor space will be created above the liquid to accommodate the expanding liquid and provide long hold times.

BRIEF DESCRIPTION OF THE DRAWINGS

FIG. 3 is a section view showing an alternate embodiment of the storage tank of the invention.

FIG. 4 is a section view showing another alternate embodiment of the storage tank of the invention.

DETAILED DESCRIPTION OF THE INVENTION

Figure 1:
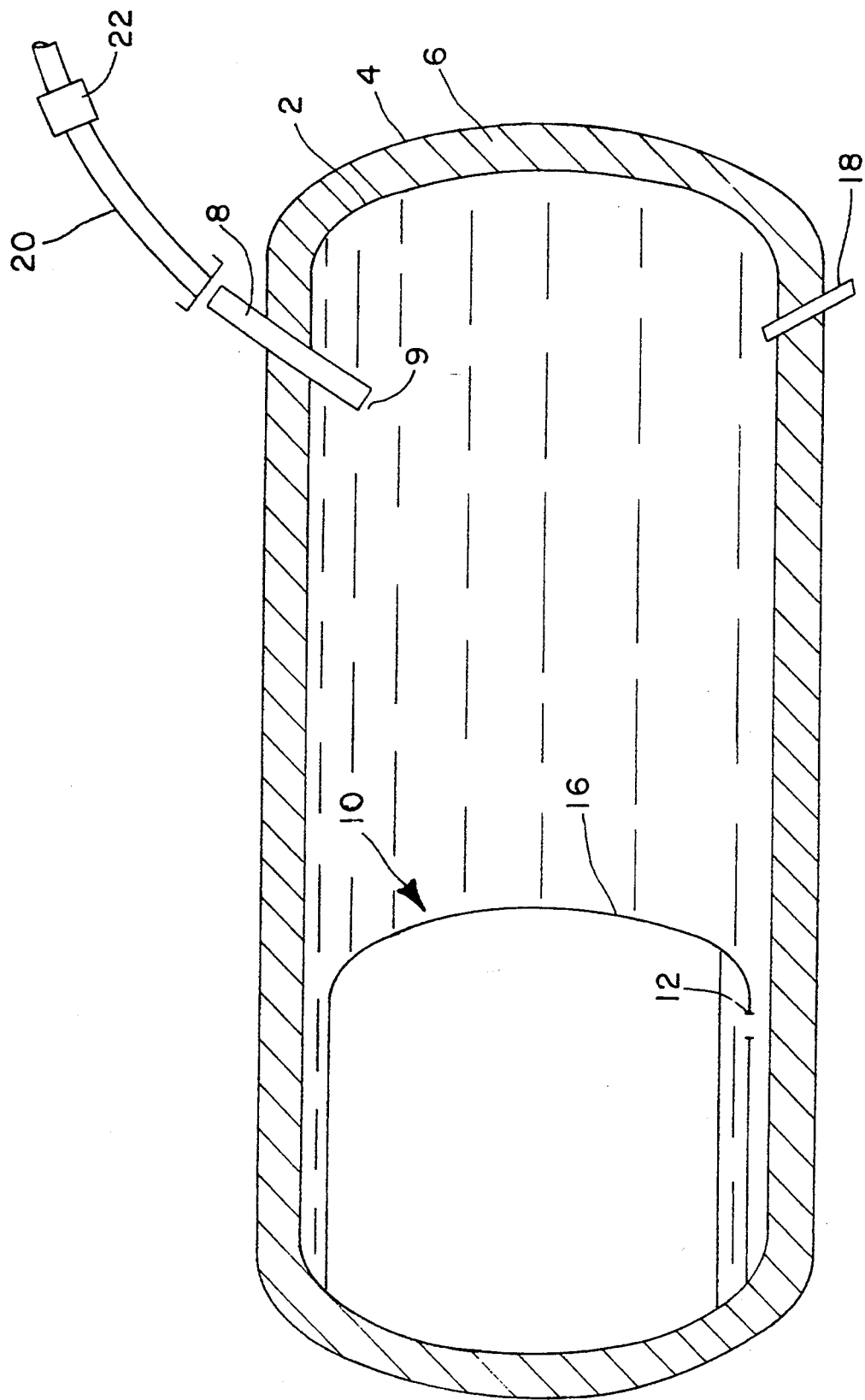
FIG. 1 is a section view showing the storage tank of the invention in an initial liquid full condition.

Referring more particularly to FIG. 1, the storage tank of the invention consists of a main storage tank 2 surrounded by a jacket 4 to define an insulating space 6 there between. While the storage tank of the invention facilitates the filling of any cryogen storage tank, it is particularly useful as a vehicle mounted horizontal storage tank such as those found on buses fueled by LNG. Space 6 can be filled with an insulating material and a vacuum can be drawn therein to minimize heat transfer between the external environment and the interior of tank 2. While insulation space 6 minimizes the transfer of heat to the cryogen stored in the tank, some heat transfer will eventually occur thereby vaporizing a portion of the liquid cryogen in the tank. The vaporized cryogen must either be accommodated or vented to avoid excessive pressure build up. Because venting is wasteful and in some instances potentially dangerous it is desirable to accommodate as much vaporizing cryogen as possible.

A fill pipe 8 having spray head 9 is provided to deliver liquid cryogen to the interior of tank 2. While fill pipe 8 is shown in a top fill position, it is to be appreciated that the tank of the invention works just as well with a bottom fill because the fill operation is not greatly affected by submersion of the spray head 9 as in the prior art.

Figure 2:
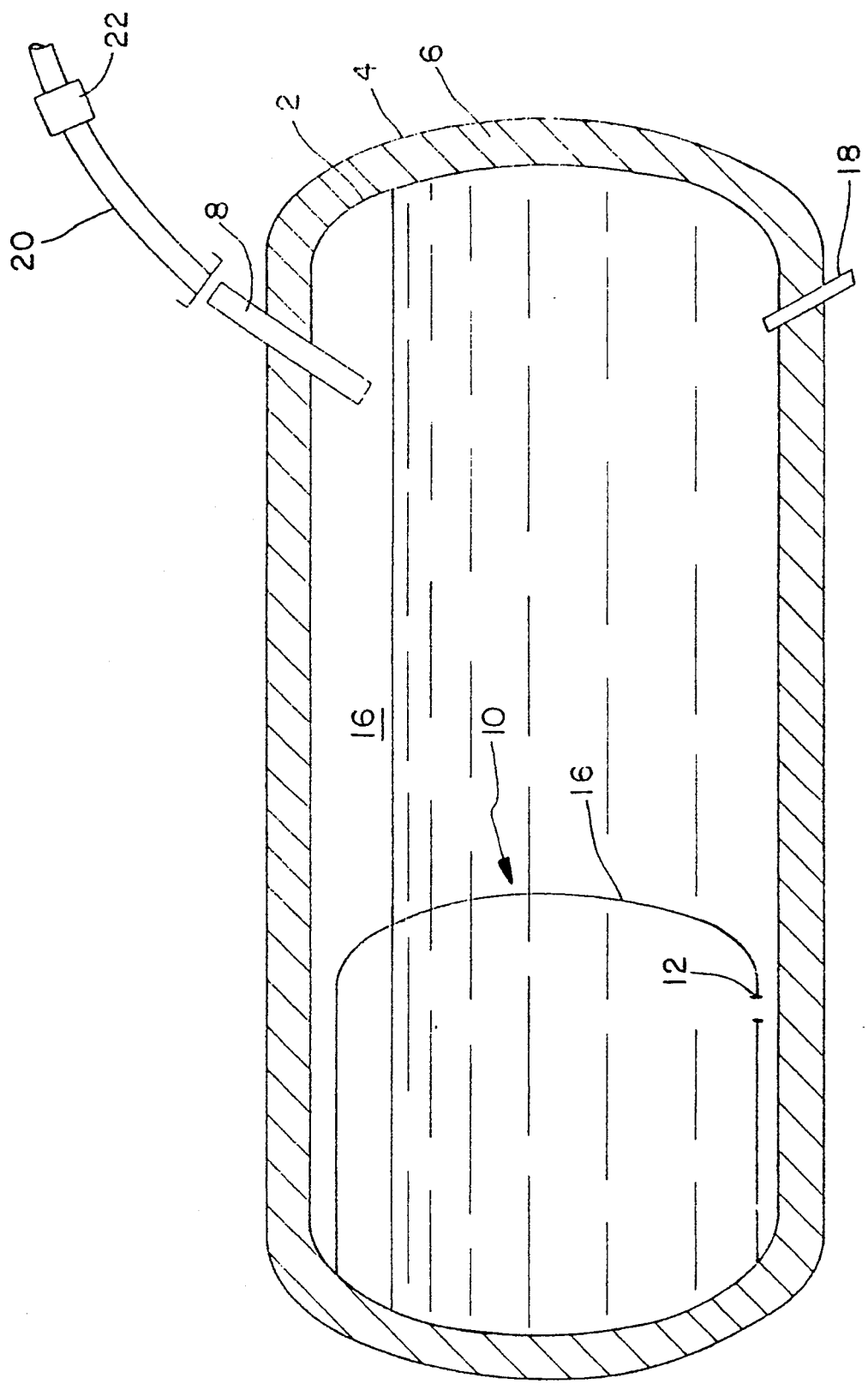
FIG. 2 is a section view showing the storage tank of FIG. 1 after the liquid level in the main tank and ullage tanks has equalized.

A secondary or ullage tank 10 is located within the primary tank 2 as shown in FIGS. 1 and 2. The actual volume ratio between main tank 2 and ullage tank 10 will vary due to operating pressure ranges and the geometry of the tanks; however, in a preferred embodiment, the volume of the ullage tank 10 is approximately 10–15 percent of the volume of main tank 2.

In the preferred embodiment illustrated in FIGS. 1 and 2, a first passage 12 is formed in the bottom of tank 10 to allow flow of liquid cryogen from tank 2 into tank 10. The flow of liquid between the tanks allows the liquid levels in the two tanks to equalize as will hereinafter be described. The passage 12 should have approximately 5 percent of the flow capacity of the fill pipe 8 to allow the main tank 2 to become liquid full without first filling tank 10. Specific examples of the relative sizes of the fill pipe 8 and passage 12 are a ½ inch diameter fill pipe with a 1/16 inch diameter passage or a ¾ inch diameter fill pipe with a 3/32 inch diameter passage although any suitable relative sizes can be used.

An alternate embodiment is shown in FIG. 3 and includes a second passage 14 formed in the top of tank 10 to allow the vapor in tank 10 to escape as the liquid level of the cryogen in the main and ullage tanks equalizes. The second passage 14 can be omitted in applications where the temperature of wall 16 is sufficiently cold, due to contact with the liquid cryogen in tank 2, to condense the vapor in tank 10 and collapse the pressure head therein. In those applications, the preferred embodiment having a single passage shown in FIGS. 1 and 2 is used.

In operation, a source of liquid cryogen 20, complete with a flow monitoring device 22, is connected to fill pipe 8 and liquid cryogen is delivered to primary tank 2. Because the incoming flow rate of cryogen through fill pipe 8 is significantly greater than the flow rate of cryogen through passage 12 into ullage tank 10, the primary tank 2 will quickly fill with cryogen while the ullage tank 10 remains substantially empty. Once tank 10 is filled, the flow in the fill pipe 8 will dramatically decrease due to the decreased flow area in tank 2 causing the flow monitoring device 22 to stop the flow of cryogen to tank 10. Because the drop in flow rate to a liquid full tank is very dramatic, a relatively insensitive and inexpensive flow monitoring device can be used. Moreover, the amount of liquid required to liquid fill tank 2 can be very accurately determined. The flow monitoring device 22 can be any device suitable of sensing liquid flow in a tube such as a pitot static tube or vane type flow sensor. Alternatively, suitable pressure sensors can also be used to sense pressure increases in the line 20 resulting from a liquid full tank if desired.

Once the delivery of cryogen to tank 2 is halted, the cryogen in tank 2 will slowly fill tank 10 via passage 12 until the liquid levels in the two tanks are equal, as best shown in FIG. 2. Passage 14, shown in FIG. 3, can be provided to allow the vapor to escape from tank 8 as cryogen enters this tank; however, because the wall 16 is sufficiently cold to condense the vapor in tank 10 in most cryogenic applications, passage 14 is preferably omitted. In the condition shown in FIG. 2, vapor space 16 is created above the liquid cryogen to allow expansion of the vaporizing LNG thereby to increase the hold time of the tank. As liquid cryogen is removed from the tank for use via use line 18, the level in tanks 2 and 8 will drop simultaneously.

An alternate embodiment of the invention is shown in FIG. 4 where like reference numerals are used to identify the like elements previously described in reference to FIGS. 1 through 3. The tanks of FIG. 4 are identical to the tanks shown in FIGS. 1 through 3 except that the secondary or ullage tank 24 having opening 26 therein is located at the top of tank 2 rather than to one side as shown in FIGS. 1 through 3. Fill pipe 8 delivers the cryogenic liquid to the interior of tank 2 as previously described and the operation of tank 24 is the same as that previously described.

Thus, the tank of the invention allows liquid full fill of the tank and its associated pressure monitoring benefits while maintaining the vapor space for increased hold time. While the invention has been described in some detail with respect to the drawings, it will be appreciated that numerous changes in the construction and details of the invention can be made without departing from the spirit and scope of the claimed invention.

What is claimed is:

1. A method for filling a tank with cryogenic fluid comprising the steps of:
   a) providing a first tank;
   b) providing a second tank;
   c) providing a passage means in said second tank and dimensioning said passage means to allow said first tank to become liquid full while said second tank is substantially filled with vapor and substantially empty of liquid, said second tank being enclosed except for said passage means;
   d) delivering a liquid cryogen to said first tank;
   e) detecting the drop in flow rate of the liquid cryogen to the first tank when said first tank becomes liquid full to stop the fill operation; and
   f) allowing said liquid cryogen in the first tank to condense the vapor in said second tank to allow entry of liquid into said second tank without venting vapor.

2. A storage tank for cryogenic liquids, comprising:
   a) a first tank;
   b) a second tank;
   c) a fill pipe for delivering a liquid cryogen to said first tank; and
   d) a passage means in said second tank, said second tank being completely enclosed except for said passage means; said passage means connecting said first tank to said second tank and being dimensioned relative to said fill pipe such that said first tank will become liquid full while said second tank is substantially filled with vapor and substantially empty of liquid; said liquid cryogen in said first tank condensing the vapor in said second tank to allow entry of liquid into said second tank without venting vapor from said second tank after said first tank is filled with liquid;

whereby a drop in the flow rate of liquid cryogen to said first tank can be detected to stop the fill operation prior to said second tank filling with liquid and thereafter the tanks will equalize to provide a ullage head for maximizing hold time of the cryogen in the tanks.

3. The storage tank according to claim 2, wherein the second tank is formed within the first tank.

4. The storage tank according to claim 2, wherein first and second tanks are thermally insulated.

5. The storage tank according to claim 2, wherein the volume of the second tank is approximately 5 to 25 percent the volume of the first tank.

6. The storage tank according to claim 2, wherein the passage has up to 30 percent the flow rate capacity of the fill pipe.

7. The storage tank according to claim 2, wherein said first and second tanks are thermally conductive with one another.

* * * * *